United States Patent [19]
Enomoto

[11] Patent Number: 5,391,334
[45] Date of Patent: Feb. 21, 1995

[54] METHOD FOR PRODUCING REINFORCED HOSE

[75] Inventor: Yukinobu Enomoto, Seki, Japan

[73] Assignee: Bridgestone Corporation, Tokyo, Japan

[21] Appl. No.: 105,155

[22] Filed: Aug. 12, 1993

[30] Foreign Application Priority Data

Aug. 17, 1992 [JP] Japan .................................. 4-217950

[51] Int. Cl.⁶ ............................................ B29C 47/06
[52] U.S. Cl. ................................ 264/40.7; 264/85;
264/103; 264/173; 264/209.2; 264/209.5;
156/149; 425/113
[58] Field of Search ................ 264/85, 103, 173, 40.7,
264/209.2, 209.5; 156/149, 244.13; 425/114,
133.1, 113

[56] References Cited

U.S. PATENT DOCUMENTS

| | | | |
|---|---|---|---|
| 3,994,761 | 11/1976 | Higbee | 264/103 |
| 4,490,316 | 12/1984 | Satzler | 264/40.7 |
| 4,517,039 | 5/1985 | Satzler | 156/149 |
| 4,604,155 | 8/1986 | McKiernan | 156/149 |
| 4,668,319 | 5/1987 | Piccoli | 156/149 |
| 4,952,262 | 8/1990 | Washkewicz et al. | 156/149 |
| 5,019,309 | 5/1991 | Brunnhofer | 264/40.7 |

FOREIGN PATENT DOCUMENTS

| | | | |
|---|---|---|---|
| 61-127335 | 6/1986 | Japan | 264/103 |
| 61-222728 | 10/1986 | Japan | 264/103 |

Primary Examiner—Mathieu D. Vargot
Attorney, Agent, or Firm—Sughrue, Mion, Zinn, Macpeak & Seas

[57] ABSTRACT

A method for producing continuously a long reinforced hose having a plurality of reinforcement layers. An inner reinforcement layer is formed by braiding steel wires or fibers on a mandrel and a rubber is extruded onto the inner surface of the reinforcement layer to form an inner rubber layer therein. An adhesion rubber is then extruded onto the outer surface of the inner reinforcement layer to form an adhesion rubber layer thereon and at the same time an outermost reinforcement layer is formed on the adhesion rubber layer by braiding on a mandrel. The unvulcanized hose including the respective layers is pulled at a speed higher than the braiding speed of the outermost reinforcement layer, thereby firmly joining the reinforcement layers and then pulled at a lower speed but still higher than the braiding speed, thereby more firmly urging both the reinforcement layers to each other. While the pulling speed is kept at the lower speed, a rubber sheath is formed on the hose and the unvulcanized hose is then vulcanized.

6 Claims, 3 Drawing Sheets

5,391,334

METHOD FOR PRODUCING REINFORCED HOSE

BACKGROUND OF THE INVENTION

The present invention relates to a method for continuously producing a reinforced hose having a plurality of reinforcement layers without using a core member or a protective cover for a rubber sheath.

An example of such a method for producing high-pressure hoses having braided reinforcement layers without using a core member or a protective cover for a rubber sheath is disclosed in Japanese Patent Application Publication No. 4-3,737. In the disclosed method, a hose formed by an extruder is pulled at a speed higher than the extruding speed of the extruder through a hardening device.

With this method, by the higher pulling speed the hose made of an elastomer is elongated to change braided angles of reinforcement members to angles slightly less than a predetermined angle. By releasing the pulling, forces acting upon the hose the reinforcement members are restored toward their original shapes to obtain the predetermined optimum braided angles.

However, such a prior art method is employed for producing a hose having a single reinforcement layer. Even if the method could be applied to the production of hoses having plural braided reinforcement layers, the joint strength between the plural reinforcement layers of produced hoses is not increased sufficiently. Therefore, it is impossible to improve effectively the pressure-resistance of reinforced hoses produced according to the prior art method.

In greater detail, a hose having plural, for example two reinforcement layers is generally designed to have average braided angles of these reinforcement layers substantially equal to the angle of repose (54°44′). This is to prevent the entire hose from elongating and contracting upon being subjected to inner pressure and to exhibit its pressure-resistance in cooperation with the inner and outer reinforcement layers by permitting the inner reinforcement layer to be expanded and the outer reinforcement layer to be contracted upon being subjected to the inner pressure.

In other words, it is usual to design the hose in a manner that braided angles of inner reinforcement layers are less than the angle of repose and braided angles of outer reinforcement layers are greater than the angle of repose. Therefore, when the hose having inner and outer reinforcement layers is pulled in unvulcanized state by a pulling speed so that the average braided angles are about 53° according to the prior art, the inner reinforcement layer inherently having the smaller braided angles and the outer reinforcement layer inherently having the larger braided angles are simultaneously pulled so that the contraction in diameter of the inner reinforcement layer becomes larger than that of the outer reinforcement layer. As a result, the clearance between the inner and outer reinforcement layers becomes larger than its initial value. In the prior art method performing the vulcanization of unvulcanized rubber during pulling the hose with such a pulling speed, it is, therefore, impossible to join the inner and outer reinforcement layers with a sufficient joining force.

SUMMARY OF THE INVENTION

It is object of the invention to provide a method for producing a reinforced hose having a plurality of reinforcement layers sufficiently firmly joined with each other without requiring a core member or a protective cover for a rubber sheath.

In producing a reinforced hose having a plurality of reinforcement layers arranged between an inner rubber layer and a rubber sheath, the method according to the invention comprises steps of joining an outermost reinforcement layer, for example, a second reinforcement layer formed by braiding on a hollow mandrel to an inner reinforcement layer, for example, a first reinforcement layer arranged on the inner circumference of the outermost reinforcement layer with an adhesion rubber layer interposed therebetween, pulling a composite body including the inner rubber layer, the inner and outermost reinforcement layers and the adhesion rubber layer and, as the case may be, a rubber sheath at a speed higher than the braiding speed of the outermost reinforcement layer, for example, a speed of about twice the braiding speed to deform both the first reinforcement layer and the second reinforcement layer moved away from the mandrel to be radially contracted and then somewhat slowing down the pulling speed to a lower speed but still higher than the braiding speed to deform the first and second reinforcement layers to be radially expanded, and thereafter vulcanizing the unvulcanized hose including a rubber sheath, while the pulling speed is kept at said lower speed.

In the method according to the invention, the inner and outer reinforcement layers with the adhesion rubber layer interposed therebetween are pulled, for example, at a speed of about twice the braiding speed of the outer reinforcement layer. Therefore, the inner reinforcement layer is contracted in radial directions and elongated in length directions substantially to its elongation limit value so that the resistance to further elongation of the inner reinforcement becomes greater. On the other hand, the outer reinforcement layer having the larger braided angles in design can elongate further even under this condition so that the outer reinforcement layer can further elongate. As a result, the clearance between the inner and outer reinforcement layers becomes narrower than the original clearance. At this moment, therefore, both the reinforcement layers are substantially firmly joined together and sufficiently combined with the adhesion rubber layer.

As a result of the pulling action described above, the inner reinforcement layer has sufficiently small braided angles, while the outer reinforcement layer has larger braided angles than those of the inner reinforcement layer. Under this condition, thereafter, the pulling speed is somewhat slowed down to deform both the reinforcement layers to be radially expanded simultaneously so that the expansion in diameter of the inner reinforcement layer having the smaller braided angles becomes larger than that of the outer reinforcement layer having the larger braided angles. Therefore, a force tending to narrow the clearance between both the reinforcement layers occurs. As the vulcanization is carried out for the unvulcanized hose under this condition, the inner and outer reinforcement layers can be firmly joined in a reliable manner in conjunction with the sufficient combination of both the reinforcement layers with the adhesion rubber layer. As a result, the durability of the reinforced hose can be greatly improved.

The invention will be more fully understood by referring to the following detailed specification taken in connection with the appended drawings.

DESCRIPTION OF THE PREFERRED EMBODIMENTS

Figure 1:
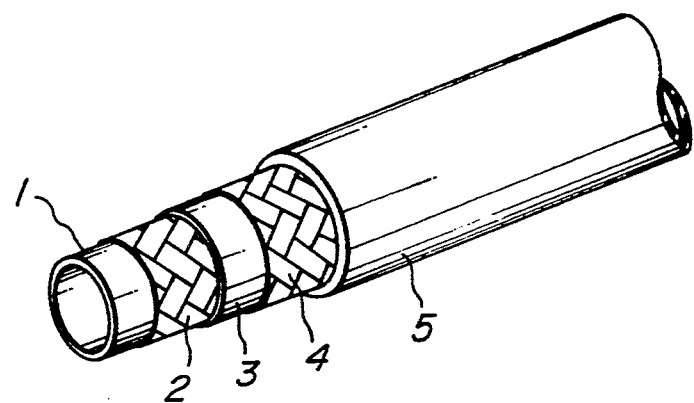
FIG. 1 is a perspective view illustrating a hose, partially broken away, produced by the method according to the invention.

Referring to FIG. 1 illustrating a vulcanized hose manufactured by the method according to the invention, it composed of an inner rubber layer 1, an inner reinforcement layer 2 formed by braiding natural fibers, synthetic fibers, or steel wires and arranged on the outer circumference of the inner rubber layer 1, an adhesion rubber layer 3 arranged on the outer circumference of the inner reinforcement layer 2, an outer reinforcement layer 4 formed by the similar material to that of the inner reinforcement layer 2 and arranged on the outer circumference of the adhesion rubber layer 3, and a rubber sheath 5 covering the outer reinforcement layer 4.

Figure 2:
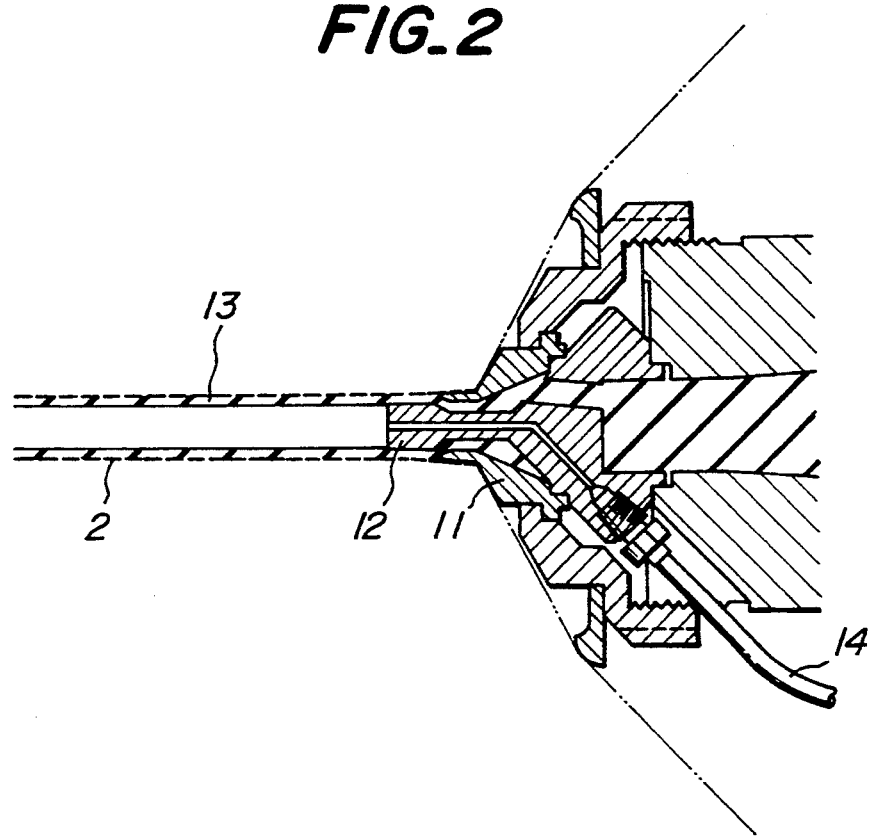
FIG. 2 is a sectional view illustrating, by way of example, a process for forming an inner rubber layer on the inner surface of an inner reinforcement layer according to the invention.

The vulcanized hose constituted as described above can be produced in the following manner according to the invention. First, as shown in FIG. 2, reinforcing fibers or steel wires are braided on a tapered hollow mandrel 11 mounted on the forward end of an inner tube extruder to form a cylindrical reinforcement layer 2 which is progressively slid down the tapered surface of the mandrel 11 and then advanced forward. Immediately after the reinforcement layer 2 leaves the mandrel 11, a rubber is extruded from the inner tube extruder through the clearance between a mouthpiece 12 and the mandrel 11 onto the inner surface of the advancing reinforcement layer 2 to form an inner rubber layer 13 on the inner surface of the reinforcement layer 2.

It is preferable that an inert gas, for example, nitrogen gas is supplied into the inside of the inner rubber layer 13 through a tube 14 to urge the inner rubber layer onto the reinforcement layer 2 in order to bring the rubber layer 13 into close contact with the reinforcement layer 2.

Figure 3:
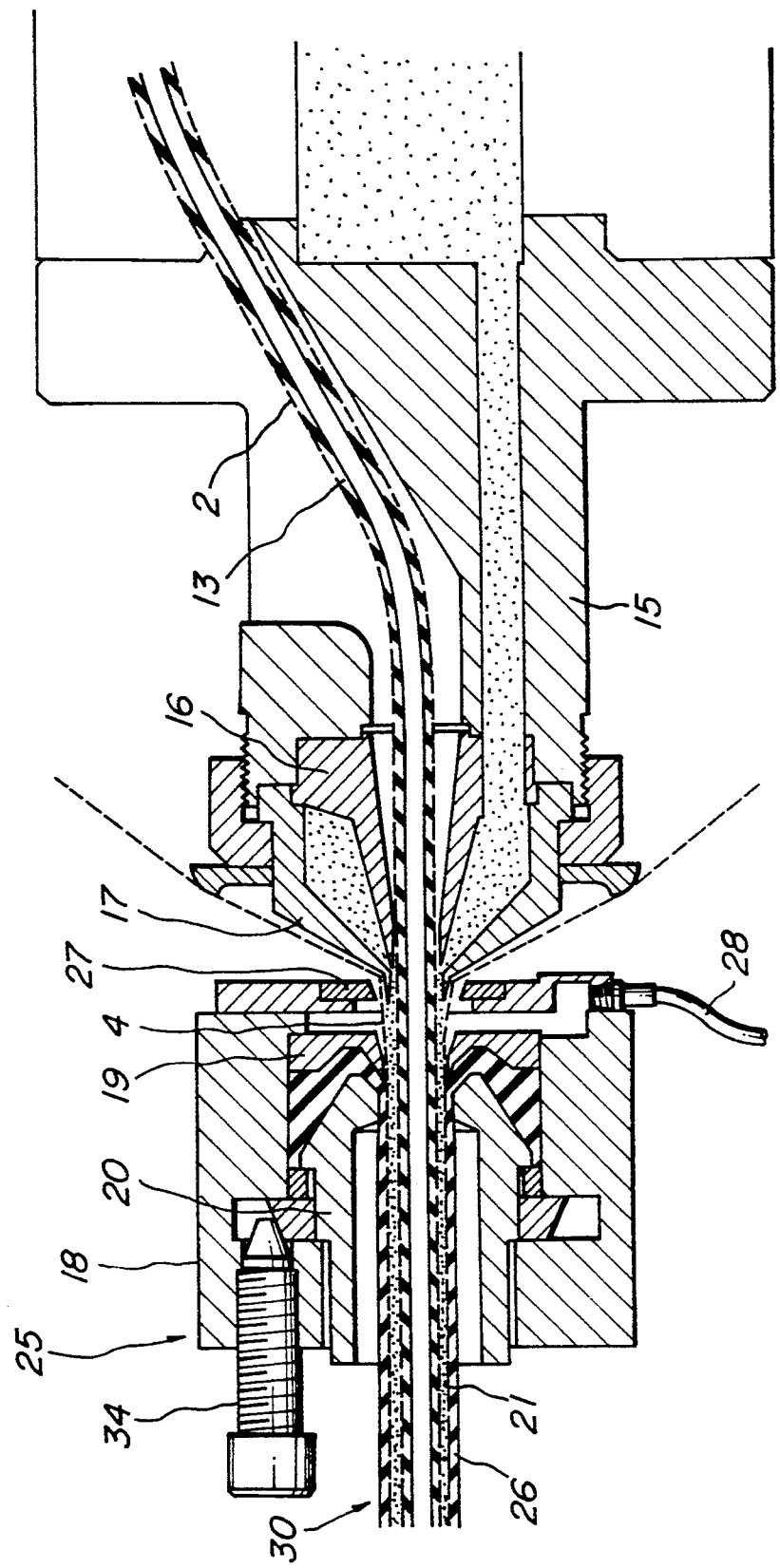
FIG. 3 is a sectional view illustrating, by way of example, processes for forming an adhesion rubber layer, an outer reinforcement layer, and a rubber sheath according to the invention.

As shown in FIG. 3, the inner reinforcement layer 2 formed with the inner rubber layer 13 is then caused to pass through the through-aperture of the extruder block 15 mounted on the forward end of an adhesion layer extruder and through the mouthpiece 16 for positioning the inner reinforcement layer 2 and the mandrel 17 for forming the outer reinforcement layer 4. As a result, a composite body is formed which includes an adhesion rubber layer 3 and an outer reinforcement layer 4 in addition to the inner rubber layer 13 and the inner reinforcement layer 2 after passed through the mandrel 17 as explained in more detail later. Thereafter, the composite body is caused to pass in succession through the positioning mouthpiece 19 in the extruder block 18 provided on a rubber sheath extruder and through the mouthpiece 20 for forming a rubber sheath.

During the above processes shown in FIG. 3, an adhesion rubber is extruded through the passage formed in the extruder block 15 and the clearance between the mouthpiece 16 and the mandrel 17 to form an adhesion rubber layer 21 on the inner reinforcement layer 2. On the other hand, reinforcement members are braided on the tapered portion of the mandrel 17 to form an outer cylindrical reinforcement layer 4 which slides down the tapered surface of the mandrel 17 to be joined with the adhesion rubber layer 21 and hence the inner reinforcement layer 2.

In this process, the composite body including the inner reinforcement layer 2, the adhesion rubber layer 21, and the outer reinforcement layer 4 is pulled at a speed higher than the braiding speed of the outer reinforcement layer 4 on the mandrel 17 so that the outer reinforcement layer 4 is elongated together with the inner reinforcement layer 2 in the directions of their lengths, thereby causing the outer and inner reinforcement layers 4 to contract in radial directions. Accordingly, the outer reinforcement layer 4 is firmly joined to the inner reinforcement layer 2 through the adhesion rubber layer 2. A drawing capstan for stretching is preferably used in the pulling of the reinforcement layer 2. However, crawler or other pulling means may also be used.

In carrying out the above method, between an inner reinforcement layer braider 22 and an outer reinforcement layer braider 23 there is preferably provided slack detecting means for detecting any slack of the inner reinforcement layer 2 formed with the inner rubber layer 13. With the aid of the detecting means the rotations of the inner reinforcement layer braider 22 and the inner rubber layer extruder 24 are suitably controlled to keep the slackening of the inner reinforcement layer 2 substantially constant.

Referring back to FIG. 3, rubber is extruded through a clearance between the mouthpiece 20 and the positioning mouthpiece 19 arranged in the extruder block 18 at the forward end of a rubber sheath extruder 25 to form a rubber sheath 26 on the outer surface of the outer reinforcement layer 4. In order to ensure the complete joining between the rubber sheath 26 and the outer reinforcement layer 4, a vacuum packing 27 is provided to introduce negative pressure produced by a vacuum pump into a clearance between the rubber sheath 26 and the layer 4 through a tube 28.

Figure 4:
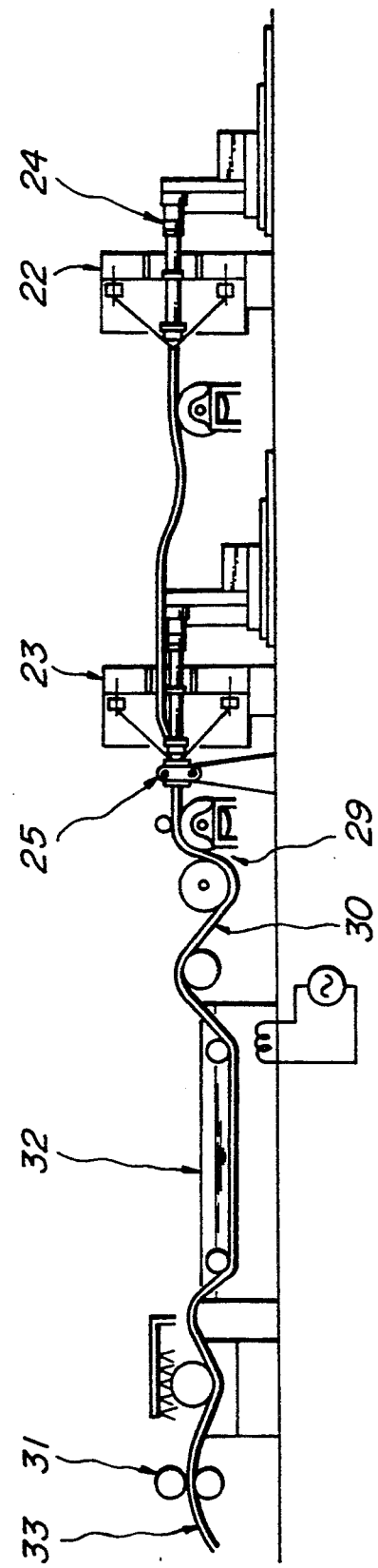
FIG. 4 is a schematic side view illustrating, by way of example, a series of processes for producing an elastic hose according to the invention.

Referring to FIG. 4, the composite body covered with the rubber sheath 26 is caused to pass a drawing capstan 29 for stretching to form an unvulcanized hose 30 with the inner and outer reinforcement layers 2 and 4 once firmly joined to each other. Thereafter, the unvulcanized hose 30 is pulled by a drawing device 31 at a speed lower than that for firmly joining the reinforcement layers described above but still higher than the braiding speed of the outer reinforcement layer 4 so that the unvulcanized hose 30 is contracted in its length directions and expanded in radial directions with the aid of its restoring force, thereby making the hose 30 to be a predetermined size. While such a pulling speed is maintained, the hose 30 of the predetermined size is caused to pass through vulcanizing means 32 to obtain a reinforced hose having the united layers as shown in FIG. 1.

In this case, moreover, the vulcanization is preferably carried out under pressure of an inert gas as described above in conjunction with the pulling force mentioned above. By releasing the pulling force and the inert gas pressure after the vulcanization, the vulcanized hose 33 is further slightly restored toward its original size. The enclosing of the inert gas can easily be performed without leakage by collapsing or clamping the forward end of the unvulcanized hose 30.

A concrete example of processes for producing hoses according to the invention will be explained hereinafter. The hoses were of the size 9φ×2WB having 9.5 mm inner diameter and 19.6 mm outer diameter and two reinforcement layers. Each of the reinforcement layers was braided by steel wires of 0.3 mm diameter with a braider having 24 carriers each having a bobbin of twisted six wires.

A mandrel 11 for forming the inner reinforcement layer 2 had a large diameter portion of 14.0 mm diameter. The steel wire was advanced on the mandrel a distance corresponding to 0.3 (mm)×6 (wires)×12 (bobbins) per one rotation of the carrier of the braider. When the revolution of the braider was 30 rpm, the advancing speed of the steel wire was 648 mm/min.

Each of the carriers was provided with steel wire curling means, such as thin pins or sharp edges. In braiding, the steel wires were rubbed on the curling means to be curled. When such curled steel wires were stretched, they tended to restore their curled conditions as coil springs. Therefore, the formed inner reinforcement layers 2 naturally became cylindrical to have a predetermined diameter with the aid of the contracting force as the coil spring described above and the restraining force of the steel wire.

On the other hand, the inner rubber layer 13 was formed by means of a mouthpiece 12 manufactured in accordance with the required thickness of the inner rubber layer. In this case, the mouthpiece 12 having the forward end diameter of 9.7 mm was used to extrude the inner rubber layer 13 of 1.2 mm thickness onto the inner surface of the inner reinforcement layer 2. The outer diameter of the inner rubber layer 13 was 14.5 mm.

Thereafter, nitrogen gas as an inert gas was supplied through the tube 14 into the inner rubber layer 13 to maintain 3 kgf/cm² of the inner pressure therein, thereby bringing the inner rubber layer 13 into close contact with the inner reinforcement layer 2. The inner reinforcement layer 2 formed with the inner rubber layer 13 was then introduced into a braider successively arranged for braiding the outer reinforcement layer 4 and caused to pass progressively through the through-aperture of the adhesion layer extruder block 15 and the mouthpiece 16 having an inner diameter of 13.0 mm and the forming mandrel 17 having an inner diameter of 13.5 mm. The adhesion rubber layer 21 was coated on the outer surface of the inner reinforcement layer 2 to a thickness of about 0.6 mm.

In this case, the outer reinforcement layer was braided on the tapered portion of the forming mandrel 17, whose large diameter portion was 17.0 mm. In the similar manner to the inner reinforcement layer 2, the steel wire was advanced on the mandrel a distance corresponding to 0.3 (mm)×6×12 per one rotation of the carrier of the braider. When the revolution of the braider was 30 rpm, the advancing speed of the steel wire was 648 mm/min. In the case that the inner and outer reinforcement layers 2 and 4 were different in number and diameter of steel wires, the advancing speeds of these layers could be substantially equal to each other by suitably determining the rotating speeds of the braiders.

Under this condition, the inner reinforcement layer 2, the adhesion rubber layer 21 and the outer reinforcement layer 4 were pulled at 1,140 mm/min by means of the drawing capstan. Immediately after the outer reinforcement layer 4 had left the mandrel 17, a rubber was extruded through the clearance between the forming mouthpiece 20 having the inner diameter of 17.8 mm and the mouthpiece 19 having the inner diameter of 17.5 mm arranged in the sheath rubber extruder block 18 onto the outer surface of the outer reinforcement layer 4 to form a rubber sheath 26. Any offset in thickness of the rubber sheath was adjusted by adjusting screws 34. Negative pressure of 700 mmHg was applied into the clearance between the rubber sheath 26 and the outer reinforcement layer 4 by the vacuum packing 27.

After the unvulcanized hose 30 had passed through the drawing capstan 29 for stretching, the pulling speed was slowed down to 980 mm/min by means of the drawing device 31 arranged upstream of a salt vulcanizing bath as vulcanizing means 32 so that the hose 30 was contracted in the length directions and expanded in radial directions in a manner to make the outer diameter of the outer reinforcement layer 4 to be 17.0 mm.

The unvulcanized hose 30 having the firmly joined layers was then introduced into the salt vulcanizing bath to vulcanize and unite the respective layers. In order to prevent the hose 30 from floating in the vulcanizing bath, the hose 30 was restrained by metal belts in the bath. The pressurized nitrogen gas was kept enclosed in the unvulcanized hose.

Finally, after the hose 30 had passed through the vulcanizing bath, the hose 30 was cooled in a cleaning bath in which the salt adhered to the outer surface of the hose was removed. The pressurized nitrogen gas was released from the hose after passed the drawing device 31.

By releasing the pulling force and the nitrogen gas, the vulcanized hose 33 was further somewhat restored in size so that the outer diameter of the outer reinforcement layer 4 became 17.1 mm.

Pressure-resistances were tested as to the reinforced hoses having two reinforcement layers produced described above and according to the prior art method. Results are shown in Table 1.

TABLE 1

| | Reinforcement layer | Outer diameter (mm) | Pitch (mm) | Braided angle (°) | Elongation & concentration on pressurizing (%) | Breaking pressure (kgf/cm²) | Joint condition of reinforcement layers |
|---|---|---|---|---|---|---|---|
| Hose according to the invention | Inner reinforcement layer | 14.1 | 32.3 | 52° 05′ | −0.3 | 1320 | Inner and outer reinforcement layers are sufficiently firmly joined. |
| | Outer reinforcement layer | 17.1 | 32.1 | 57° 45′ | | | |
| Hose | Inner | 13.6 | 33.6 | 49° 54′ | −6.5 | 860 | Inner and outer |

TABLE 1-continued

|  | Reinforcement layer | Outer diameter (mm) | Pitch (mm) | Braided angle (°) | Elongation & concentration on pressurizing (%) | Breaking pressure (kgf/cm²) | Joint condition of reinforcement layers |
| --- | --- | --- | --- | --- | --- | --- | --- |
| according to the prior art | reinforcement layer Outer reinforcement layer | 17.2 | 31.4 | 58° 29' |  |  | reinforcement layers are insufficiently joined. |

While the invention has been explained with reference to the illustrated embodiment, it will be apparent that after the inner reinforcement layer has been formed, the hose may be once wound up and thereafter the outer reinforcement and any required treatments may be applied to the hose. Moreover, an unvulcanized hose having the outer reinforcement layer and the rubber sheath may be once wound up under tension, and then subjected to the vulcanization. As an alternative, after pulling force has been applied to a composite body consisting of an inner rubber layer and inner and outer reinforcement layers, both the reinforcement layers may be deformed to expand their diameters to predetermined values and then a rubber sheath may be formed thereon.

As can be seen from the above description, the method according to the invention can continuously produce a reinforced hose having a plurality of reinforcement layers without using any core member and a protective cover for the rubber sheath. According to the invention, particularly, a composite body including an inner rubber layer and inner and outer reinforcement layers is pulled at a speed higher than a forming speed of the outer reinforcement layer to cause the two reinforcement layers to be substantially firmly joined together and to an adhesion rubber layer, respectively. The pulling speed is then somewhat slowed down to a speed still higher than the forming speed of the outer reinforcement layer to produce a force tending to reduce the clearance between the inner and outer reinforcement, thereby more firmly uniting the reinforcement layers. Accordingly, the invention can sufficiently improve the joined strength between the reinforcement layers of a hose so that the pressure-resistance of the hose can be considerably enhanced.

While the invention has been particularly shown and described with reference to preferred embodiments thereof, it will be understood by those skilled in the art that the foregoing and other changes in form and details can be made therein without departing from the scope of the claims.

What is claimed is:

1. A method for producing a reinforced hose having an inner rubber layer, outer and inner reinforcement layers arranged on the outer circumference of said inner rubber layer, an adhesion rubber layer between the reinforcement layers, and an outermost rubber sheath, said method comprising the steps of: extruding the inner rubber layer, covering the inner rubber layer with cylindrical braided wires prepared by braiding wires on a tapered hollow mandrel to form the inner reinforcement layer on the outer circumference of the inner rubber layer, extruding the adhesion rubber layer on the inner reinforcement layer, firmly covering the adhesion rubber layer with cylindrical braided wires prepared by braiding wires on a tapered hollow mandrel to form the outer reinforcement layer, pulling a composite body, including said inner rubber layer, said inner and outer reinforcement layers and said adhesion rubber layer, at a speed higher than the braiding speed of the outer reinforcement layer and applying a rubber sheath to the composite body to form an unvulcanized hose, pulling said unvulcanized hose at a lower speed that is still higher than said braiding speed to contract said unvulcanized hose in a length direction and expand in a radial direction and, vulcanizing said unvulcanized hose while the pulling speed is kept at said lower speed.

2. The method as set forth in claim 1, further comprising the step wherein during transferring said inner reinforcement layer to a position for braiding said outermost reinforcement layer, slack of said inner reinforcement layer is detected by means of slack detecting means and slack is substantially kept constant by controlling braiding of said respective braiders for the inner reinforcement layer with the aid of said slack detecting means.

3. The method as set forth in claim 1, wherein an inert gas is supplied into said inner rubber layer to urge it onto said inner reinforcement layer in order to bring said inner rubber layer into close contact with it.

4. The method as set forth in claim 3, wherein said inert gas is kept enclosed in the inner rubber layer until the vulcanization of said hose has been completed.

5. The method as set forth in claim 1, wherein each of steel wires for the reinforcement layers is curled before braiding it.

6. The method as set forth in claim 3, wherein said inert gas is nitrogen.

* * * * *